(12) United States Patent
Jorgensen

(10) Patent No.: US 6,866,836 B2
(45) Date of Patent: Mar. 15, 2005

(54) METHOD OF GENERATING HYDROGEN FROM BOROHYDRIDES AND WATER

(75) Inventor: Scott Willis Jorgensen, Bloomfield Township, Oakland County, MI (US)

(73) Assignee: General Motors Corporation, Detroit, MI (US)

( * ) Notice: Subject to any disclaimer, the term of this patent is extended or adjusted under 35 U.S.C. 154(b) by 216 days.

(21) Appl. No.: 10/243,594

(22) Filed: Sep. 13, 2002

(65) Prior Publication Data

US 2004/0052723 A1 Mar. 18, 2004

(51) Int. Cl.$^7$ ................................................. C01B 3/04
(52) U.S. Cl. ............................... 423/658.2; 423/648.1; 429/17
(58) Field of Search .................. 423/648.1, 658.2; 429/17

(56) References Cited

U.S. PATENT DOCUMENTS 5,372,617 A    12/1994    Kerrebrock et al.

Primary Examiner—Stanley S. Silverman
Assistant Examiner—Maribel Medina
(74) Attorney, Agent, or Firm—Kathryn A. Marra

(57) ABSTRACT

A method is provided that generates hydrogen to power a hydrogen consuming device. Hydrogen is stored on-board a vehicle in dry lithium and/or sodium borohydride particles. Upon demand from the hydrogen consuming device, such as a fuel cell, a portion of the borohydride is conveyed to an axial flow reactor. Water is then injected into the reactor in controlled amounts to hydrolyze the borohydride particles thus, producing hydrogen gas and solid-phase by-products. The reactor includes parallel, closely spanned, counter rotating augers to mix and convey the borohydride particles and solid by-products through the reactor. A separate grinding mechanism can be used to further crush and grind large by-product particles to increase packing efficiencies in a by-products storage vessel, where reaction products will later be stored. Hydrogen gas produced in the reaction is delivered to either a hydrogen buffer container for temporary storage or to the hydrogen consuming device.

12 Claims, 1 Drawing Sheet

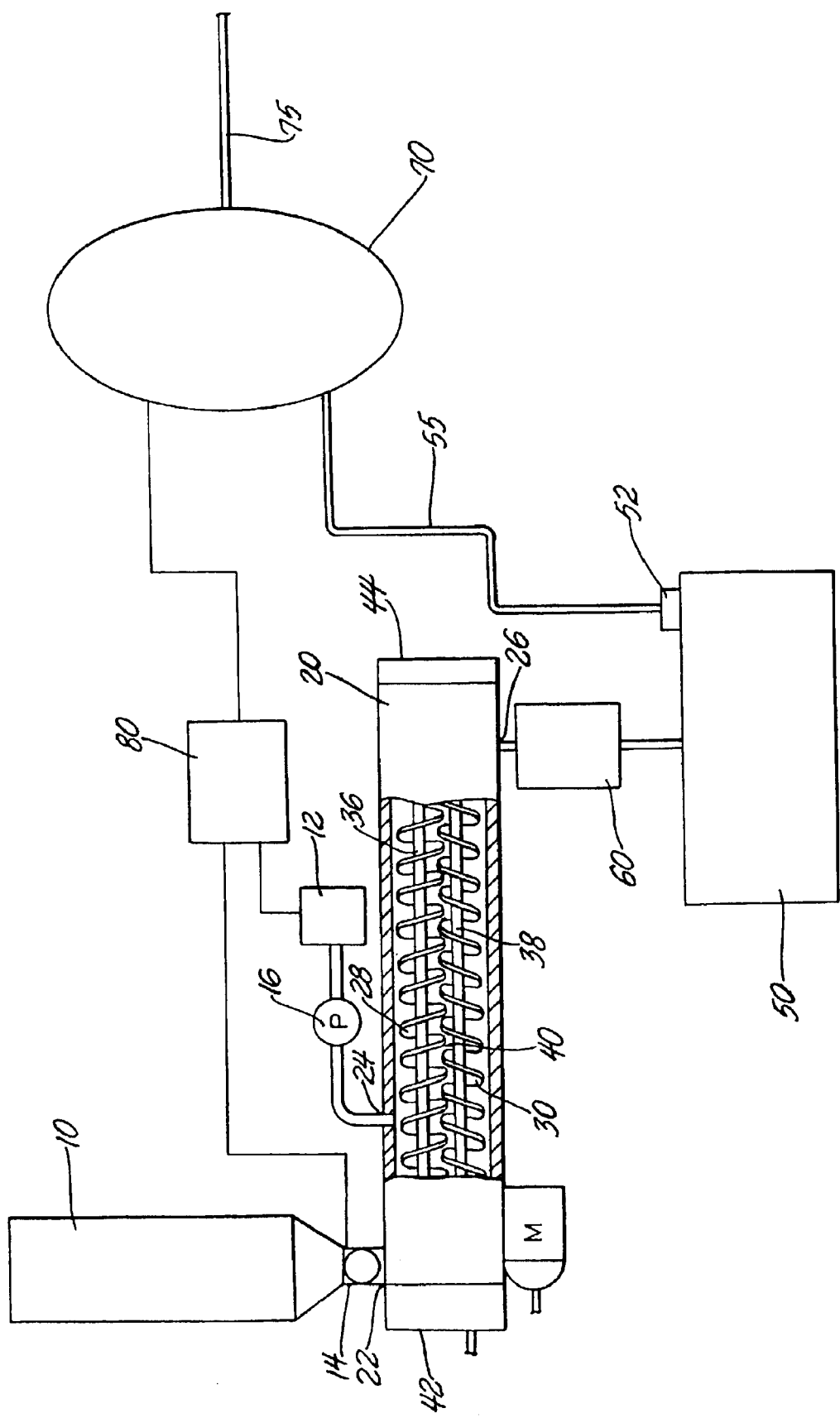

METHOD OF GENERATING HYDROGEN FROM BOROHYDRIDES AND WATER

TECHNICAL FIELD

This invention relates to hydrogen generation systems and more specifically, to a process of generating hydrogen by hydrolyzing dry borohydride particles separately stored from water.

BACKGROUND OF THE INVENTION

In place of hydrocarbons as a source of energy to generate power, hydrogen has been suggested as being a more beneficial alternative. Hydrogen gas can generate more power per gram and emit less, or even no, exhaust pollutants into the atmosphere. However, the problem of using hydrogen as a power source is its difficulty to store, especially in on-off mobile applications.

Hydrogen gas can be stored at high pressures in thick walled vessels on-board a motorized vehicle. These vessels are heavy, and high pressure is a concern. Metal hydrides, $MH_x$, contain thermally releasable hydrogen, but only in small, inefficient amounts. Lithium and sodium borohydrides contain a higher proportion of hydrogen that can be released by hydrolysis. But this approach, too, is an engineering challenge.

In U.S. Pat. No. 5,372,617, Kerrebrock, et al., water is added to pelletized or granular hydride particles in a pressurizable reaction chamber vessel upon demand for hydrogen gas from a fuel cell. The system is used to power a submersible vessel and is intended for generally continuous operation for the duration of the task of the undersea vehicle. Lithium borohydride, for example, and water react to form hydrogen and solid by-products. The addition of water is used to control the supply of hydrogen gas to the fuel cell. Solid by-products formed during hydrolysis are retained in or returned to the hydride storage portion of the system. This practice impedes further reaction of water with unreacted hydride. Furthermore, the practice relies on continuous operation at an elevated temperature to avoid water consumption as hydrates. The Kerrebrock, et al process is not useful in applications like automotive vehicles requiring go and stop operation.

Thus, it is an object of the present invention to provide a hydrogen generation system suitable for start and stop vehicle operation. Hydrogen containing particles and water are stored separately until needed. They must then be supplied to a suitable hydrolysis reactor in chemically balanced proportions. Since the water reacts at the surfaces of the hydride particles to form a solid by-product in addition to hydrogen gas, the reactor must be adapted to break off and move the solid by-products, facilitating the reaction and the removal of by products. It is a further object of the present invention to provide a hydrogen generation system that is compact and requires a minimal amount of power consuming equipment.

SUMMARY OF THE INVENTION

This invention provides a method of generating hydrogen to power a hydrogen consuming device, particularly a mobile device such as an automotive vehicle. The method is based on the hydrolysis of dry lithium and/or sodium borohydride particles. The use of lithium borohydride granules or pellets is preferred because of the higher yield of hydrogen per unit weight of reacting mass.

The invention uses an axial flow reactor, preferably an elongated tubular or cylindrical reactor. Two parallel, closely spaced augers are used to transport the dry borohydride from an inlet at one end of the reactor to the outlet. The borohydride is stored outside the reactor in a container adapted for feeding the particles to the reactor inlet. Water is introduced just downstream of the inlet to commence hydrolysis of the hydrogen containing particles.

Upon demand from a hydrogen consuming device, borohydride particles are conveyed from storage to the axial flow reactor. Water is injected into the reactor in chemically balanced amount and is suitably heated to a temperature of, e.g., 120° C. where the hydrolysis reaction is then exothermic and self-sustaining. The borohydride particles then hydrolyze to produce a demanded quantity of hydrogen gas and solid by-products.

The borohydride particles and/or water can be separately heated prior to entering the reactor vessel using waste heat from the reactor or a supplemental heater. Supplemental heating, however, is used to maintain reaction temperatures only if the amount of heat generated during hydrolysis is insufficient (e.g., at start up).

The water injected into the reactor near the inlet end reacts at the surfaces of the borohydride pellets. Hydrogen gas is evolved from the surfaces and a porous solid by-product is also formed. The solid by-product includes alkali metaborate compounds which tend to coat unreacted hydride particles and inhibit further hydrolysis. Any non-consumed water, some of it as vapor, will remain as well. In order to convey the reacting mass along the axis of the reactor and continually expose unreacted borohydride particle surfaces to the water, the mixing, masticating and conveying functions of the two augers, or their equivalents, is important.

Thus, the two augers provide a tri-functional mixing/grinding/conveying purpose. First, the mixing elements are used to expose by-product coated borohydride particles to water. Second, the mixing elements crush foamy or porous by-product agglomerations into manageable particles, preferably a powder. As a powder, by-product waste can be easily and compactly stored, or packed, in a lower volume byproducts storage vessel. Third, the mixing elements operate as a two-phase mass handling device that transports solid and liquid materials axially through the reactor. The flow of the generated hydrogen and gravity (in the case of the inclined or vertical reactor) also assist in conveying all reaction products through and out of the axial flow reactor vessel.

Preferably, the two augers are mirror-like in design (one right-handed and one left-handed), closely spaced along the axis of the reactor and rotated in opposite directions. The faces of their rotating helical threads cooperate to mix and masticate the mixture of borohydride particles and solid by-products.

The axial flow reactor thus comprises an inlet at the upstream end for the borohydride particles, an inlet for measured delivery of water near the borohydride inlet and an outlet at the downstream end of the reaction space for discharge of hydrogen gas and solid by-products. The volume of the reactor accommodates the counter rotating augers, the mass of reactants and solid by products and the hydrogen gas that is generated. Preferably, the volume of the reactor is adapted to contain a specified delivery of the borohydride, water and solid by-products and to contain an appreciable volume of hydrogen under a suitable pressure. The volume for the generated hydrogen is to be at least as large as the volume to accommodate the solid materials and water.

It is contemplated that a significant application for this invention will be to deliver hydrogen on intermittent demand from a vehicle power source. Ample supplies of borohydride and water will be separately stored on the vehicle and delivery systems and the reactor will operate when the fuel cell or engine requires fuel. The hydrogen will likely be maintained under suitable pressure in a buffer container near the fuel consumer. Thus, provision is made for delivery of the hydrogen to the buffer container, or the like, and storage of the solid by-products until they can be removed from the vehicle for reprocessing or disposal.

The hydrogen may be separated from the by-products in the reactor or after removal from the reactor. The by-products are preferably directed to a by-product storage vessel to cool where hydrogen separation can be accomplished as well. If the by-products still comprise large particles after exiting the reactor, a supplemental grinding mechanism can be used.

The temperature of the unheated storage vessel will normally be cooler than the reactor and some of the water vapor generated in the reactor will condense in the by-products storage vessel. Hydrogen is vented from the by-products storage vessel directly to the hydrogen consuming device or to a buffer container. If the pressure of the hydrogen from the by-products storage tank is not high enough to enter the buffer container, a screw compressor or other pressure increasing device may be employed.

These and other objects and advantages of this invention will become apparent from a detailed description of the specific embodiments that follow.

BRIEF DESCRIPTION OF THE DRAWING

The FIGURE is a schematic view of a hydrogen generation system showing an axial flow reactor system where borohydride particles and water are introduced from separate storage vessels into a reactor upon demand by a fuel consuming device. The system is adaptable for mobile applications and intermittent operation.

DESCRIPTION OF THE PREFERRED EMBODIMENT

A method is provided that generates hydrogen to power a hydrogen consuming device, e.g., a fuel cell. Hydrogen is stored on-board a motorized vehicle in the form of dry lithium borohydride and/or sodium borohydride pellets of essentially uniform size and mass, or in the form of a powder. Lithium borohydride is preferred for use in the method of this invention because it has the highest mass of hydrogen for a given mass of hydride, and is the lightest borohydride available. Furthermore, it generates substantial heat upon hydrolysis reducing the requirement for a supplemental heat source.

Hydrogen is generated by hydrolyzing the borohydride using a stoichiometrically balanced (i.e., substantially chemically balanced) amounts of borohydride and water. More specifically, the optimal yield of hydrogen gas is generated by maintaining a 1.6 to 2.5 parts by mass of water per 1 part of lithium borohydride mixture, or 1 to 1.5 parts by mass of water per 1 part of sodium borohydride mixture. Upon completion, this reaction produces a demanded quantity of hydrogen gas, solid by-products and heat according to the following equation:

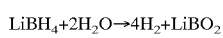

Hydrolysis of lithium borohydride is initiated by injecting water on the borohydride particles that were separately conveyed to an axial flow reactor 20. During steady state operation, the exothermic reaction generates enough heat to maintain reaction completion temperatures of approximately 120° C. During the process, hydrates of lithium metaborate can form. Maintaining a temperature of about 120° C. will drive the water from the hydrate and thus, allow it to react further with the remaining hydride.

The present invention stores hydrogen in dry lithium borohydride particles, in the form of either a pellet or a powder, separately from water at ambient temperatures. As shown in the Figure, a removable canister 10 containing lithium borohydride particles are used. As the supply of lithium borohydride depletes, the depleted canister is replaced. A chemically balanced amount of water is stored on-board the vehicle in a separate storage tank 12. The two tanks could be physically separated, but may also be attached to each other for simpler insertion and removal of materials. The water tank comprises a drybreak connection or a valve (not shown), whereas the hydride container comprises a ball valve or other seal (not shown) that prevents contact with the atmosphere in storage.

Hydrogen gas production is to be activated on request by a hydrogen consuming device, e.g., a vehicle fuel cell (not shown), to which a specific quantity of hydrogen gas is delivered when needed. Usually the generated hydrogen will be directed to a buffer container 70 and then delivered from buffer 70 through line 75 to a fuel cell, or other hydrogen consuming device. When the hydrogen pressure or content of buffer 70 drops below a predetermined level, a sensor (not shown) signals the need for more hydrogen gas.

When hydrogen gas is needed, the sensor or buffer 70 sends a signal to a control module, or other command device, 80 to activate the system. A signal is conveyed to storage tank 10 where delivery of lithium borohydride pellets is actuated. Also, another signal is sent to water tank 12 where a pump 16 is activated and a valve (not shown) is opened to allow water to flow to injection inlet 24, downstream of borohydride inlet 22 at the upstream end of axial flow reactor 20. Other equipment, such as motor M for reactor 20, is actuated at the same time.

Upon demand from the hydrogen consuming device (not shown), a portion of the dry borohydride is conveyed to reactor 20 by means of a solids handling device 14, such as an auger. If borohydride pellets are used, one pellet at a time can be delivered to reactor 20 using a rotating delivery device instead of an auger. For example, one pellet is delivered by rotation of the device. The device may also include a crushing mechanism that would break the pellets down into a powder or smaller particle sizes before entering the reaction zone.

The reaction zone comprises reactor 20 and a grinding mechanism 60. In its simplest conception, reactor 20 is a tube with heat exchange for heating or cooling, an inlet 22 for the entrance of solid lithium borohydride, an injection point 24 for water, and an outlet 26 for the outward flow of reaction products. Pressure sealing means (not shown) may be provided at inlet 22 to prevent back flow to the storage vessel 10 if desired. If no such device is provided, the storage vessel can be constructed to tolerate the anticipated hydrogen delivery pressure required by the hydrogen consuming device. In general, reactor 20 can be either a uniform diameter tube or a tube with a continuously increasing inner diameter to help facilitate the exit of gas and initially large (multi-inch), solid by-product bodies, typically lithium metaborate foam. Furthermore, the vessel of reactor 20 preferably is insulated for thermal management.

The method of this invention uses a stirred axial-flow reactor that includes a mixing/grinding element therein to free trapped lithium borohydride particles from large by-product solids formed at borohydride surfaces. More specifically, reactor 20 is a tubular reactor that comprises two augers 28, 30, one right-handed and one left-handed. Augers 28, 30 are continuous mixing/grinding elements integrally attached to the ends 42, 44 of reactor tube 20. They are driven by motor M through a drive linkage (not shown). Each auger 28, 30 comprises a single continuous helical thread carried on a shaft 36, 38, respectively. Preferably, augers 28, 30 are aligned closely together in parallel and rotate in opposing directions. The reach of the outer edges of the threads of augers 28, 30 overlap, for example, at the center 40, and thus produces an "8" in a cross sectional view of the dual auger configuration.

In operation, the dual helix counter-rotating configuration provides multiple functions. The helical faces of auger 28 pushes against the faces of auger 30 where they overlap and thus, crush the particles caught in between them. In this way the augers 28, 30 provide a crushing or grinding mechanism so that large, foamed, by-product particles are ground into more transportable and storable particles. The smaller particle size allows storage of a greater amount of by-product particles. Furthermore, mixing takes place as the reacting materials are conveyed through reactor 20 and unreacted material is exposed as the by-products are crushed by the augers 28, 30, thus promoting further reaction.

In addition to crushing solid by-product particles, the rotating augers promote axial flow of reaction products pushing them through reactor 20 and out of the reaction zone.

The delivery of lithium borohydride and water to reactor 20 is managed so that the reactor is not full of solid reactants and by-products. A space is retained for the hydrogen gas formed in the reactor. Preferably, the gas space is at least as large as the reactor volume occupied by the borohydride-water-solid by-product mass.

Part way down the reactor from the borohydride inlet, water is injected into reactor 20 from its own storage vessel 12 by means of a pump 16. Only a single injection site is required, though multiple sites would function as well. By reducing the number of injection sites to one, the cost and complexity of the device would be reduced. The reaction generates a mixture of hydrogen, some water vapor, lithium metaborate, unreacted lithium borohydride, heat and pressure. Injecting water in stoichiometric proportion, or in chemical balance, to the borohydride through injection area 24 allows easy control of the generation of hydrogen gas. An excess of water will decrease the mass-efficiency of hydrogen storage, and in some cases will consume enough of the heat released from hydrolysis of lithium borohydride that the reaction will be greatly slowed. Furthermore, the hot reaction products will generally provide enough heat to supply the latter portions of the reactor with heat.

In the hot section of the reaction zone, additional water is released from the lithium metaborate-hydrate by heating the ground and mixed byproducts. These water molecules add to any available water in the system to promote further hydrolysis with unreacted borohydride particles, now exposed from the mixing/grinding operation of reactor 20.

Because of the solid content of the reaction products formed in reactor 20, it may be preferred to employ a supplemental grinding mechanism 60 designed specifically for the by-product solids. As shown in FIG. 1, reaction products exit reactor 20 and are transported into mechanism 60 designed specifically for grinding and any additional reaction of uncovered borohydride particles. Grinding mechanism 60 can be any suitable mechanism such as a roller grinder. Another auger forcing the solids through a screen may be suitable. The grinding mechanism 60 crushes any remaining by-product into small particle sizes before conveying all reaction products to by-products storage vessel 50. In the alternative, the reaction products can be conveyed to another reactor comprising a mixing element (i.e., a reactor with only one auger flight) or a mixing/grinding element (i.e., a reactor with two augers) therein. The second reactor can also include a supplemental heating source to maintain reaction temperatures while grinding occurs. This allows further reaction between newly exposed unreacted borohydride particles and water. The goal is to use the equipment necessary in any specific instance of this device to fully react the hydride, and to crush the large by-product particles into much smaller particle sizes before the reaction products are conveyed to by-products storage vessel 50.

By-products storage vessel 50 is a container adapted to receive the solid by-products to accommodate separation of the hydrogen from the solid by-products and temporarily contain hydrogen under pressure. It is emptied occasionally as borate-containing by-products are accumulated. As reaction products flow into by-products storage vessel 50, inertia and gravity will cause solid by-products to settle to the bottom of storage vessel 50, whereas hydrogen gas will rise to the top. The pressure built up inside storage vessel 50 will push the hydrogen gas out of storage vessel 50 and through a mesh filter 52 to remove any solids from the gas stream. The hydrogen gas is then conveyed directly through line 55 to hydrogen buffer container 70 or to the hydrogen consuming device.

Hydrogen buffer container 70 is a vessel used to store hydrogen gas at moderate pressures. Buffer containers are often used to provide a margin between different operating components in the hydrogen generation process or between the process and the hydrogen consuming device. Thus, a buffer container is designed to afford enough time to allow one part of a process to catch up while another part continues its operation. Buffer container 70 is sized for each particular application to ensure the suitable supply of hydrogen gas. Buffer container 70 can also include a vent that allows any condensed water vapor to drain from container 70. For compactness, the by-products storage tank 50 can be expanded and serve as both a by-product storage area and a buffer.

When the hydrogen consuming device needs power, hydrogen will be supplied directly from buffer container 70. Meanwhile, buffer cavity 70 will send a signal to the hydrogen generation system that it is low on hydrogen stock.

In the foregoing embodiment, the entire fuel system pressurizes itself via the generation of hydrogen gas in the reactor thus, forcing all hydrogen flow to the hydrogen consuming device. The buffer container preferably has a relief valve or back pressure regulator to release pressure if it is too high. Shut off valves (not shown) may be needed in the system to facilitate fueling or tank exchange. Furthermore, the system of stored reactants, the reactor, and the stored by-products can be treated as a single unit which will be removed and replaced together. The reactor is small relative to the storage units. Removal of a single package, comprising all components except the hydrogen buffer and the hydrogen consuming device, will reduce the number of operations required to provide new fuel where the system would be connected to the vehicle, or portable power unit, via the hydrogen buffer using a dry-break connector. This ensures that new space is made available for by-products at the same time that new reactants are added so that the by-products storage will never overfill. Water for the system can be added manually via replacing the system unit or by recycling the water from the hydrogen consumer exhaust to the water storage tank. Finally, the amount of reactants that are fed into a reactor should be limited, but sufficient, to allow the reactor to have space available for hydrogen gas production.

If desired, the by-products storage and borohydride storage tanks can be a single vessel with a moving barrier. This is accomplished using a sliding barrier or by incorporating two bladders in a single vessel. As the hydride is used up, either its bladder contracts or the sliding barrier moves to reduce the volume occupied by hydride storage and expand the volume available to by-products storage. This method optimizes space utilization, which can be important in mobile and portable power applications.

While the invention has been described using the aforementioned preferred embodiment, it is not intended to be limited to the above description, but rather only to the extent of the following claims.

What is claimed is:

1. A method of generating hydrogen in a fuel supply system combined with a hydrogen fuelled power device, said method comprising the steps of:

conveying lithium borohydride and/or sodium borohydride particles into the inlet of an axial flow reactor upon demand for hydrogen from said power device;

injecting water into said axial flow reactor adjacent said inlet upon demand for hydrogen from said power device, the amount of said water being chemically balanced to the amount of said borohydride for the hydrolysis of said borohydride;

hydrolyzing said borohydride particles with said water in said reactor at a temperature above approximately 90° C. to produce reaction products comprising hydrogen gas and solid by-products while mixing said borohydride particles and solid by-products in said reactor to expose unreacted borohydride particle surfaces for reaction with said water, and conveying the mixed materials through said reactor to an outlet axially removed from said inlet, said mixing and conveying along the axis of said axial flow reactor being accomplished using two rotating cooperating augers, the rate of conveying of said borohydride being controlled so as to retain a hydrogen gas volume in said reactor;

removing said reaction products from said outlet of said reactor; and conveying said hydrogen gas to said hydrogen fuelled device or to a hydrogen buffer container for said device.

2. A method as recited in claim 1 comprising hydrolyzing said borohydride particles at temperatures of at least 120° C.

3. A method as recited in claim 1 comprising injecting said water in the amount of 1.6 to 2.5 parts by weight per 1 part of said lithium borohydride particles.

4. A method as recited in claim 1 comprising injecting said water in the amount of 1 to 1.5 parts by weight per 1 part of said sodium borohydride particles.

5. A method as recited in claim 1 comprising conveying said reaction products from said reactor to an unheated by-products storage vessel.

6. A method as recited in claim 1 comprising conveying said reaction products from said reactor to an unheated by-products storage vessel and conveying hydrogen gas from said by-products storage vessel to said hydrogen fuelled device or to a hydrogen buffer container for said device.

7. A method as recited in claim 1 further comprising conveying said reaction products from said reactor to a grinding vessel and further mixing and grinding said borohydride particles and said solid by-products in said grinding vessel before conveying said hydrogen gas to said hydrogen fuelled device or to a hydrogen buffer container for said device.

8. A method of generating hydrogen in a fuel supply system combined with a hydrogen consuming device, said method comprising the steps of:

conveying lithium borohydride and/or sodium borohydride particles into the inlet of an axial flow reactor upon demand for hydrogen from said hydrogen consuming device;

injecting water into said axial flow reactor adjacent said inlet upon demand for hydrogen from said hydrogen consuming device, the rate of injection of said water being chemically balanced to the rate of conveying of said lithium borohydride for the hydrolysis of said borohydride;

reacting said borohydride particles and water in said axial flow reactor at a temperature above approximately 900° C. to produce reaction products comprising hydrogen gas and solid by-products while mixing said borohydride particles and solid by-products in said reactor to expose unreacted borohydride particle surfaces for reaction with said water, and conveying the mixed materials through said reactor to an outlet axially removed from said inlet, said mixing and conveying along the axis of said axial flow reactor being accomplished using two parallel counter-rotating augers, the rate of conveying of said borohydride being controlled so as to maintain a hydrogen gas volume at least as large as the volume of said mixed materials in said reactor;

removing said reaction products from said outlet of said reactor;

conveying said reaction products and said borohydride particles to a grinder/reactor;

reacting said borohydride particles and water in said grinder/reactor at a temperature of about 120° C. to produce further reaction products comprising hydrogen gas and solid by-products;

removing said reaction products from said grinder/reactor; and conveying said hydrogen gas to said hydrogen consuming device or to a hydrogen buffer container for said device.

9. A method as recited in claim 8 comprising injecting said water in the amount of 1.6 to 2.5 parts by weight per 1 part of said lithium borohydride particles.

10. A method as recited in claim 8 comprising injecting said water in the amount of 1 to 1.5 parts by weight per 1 part of said sodium borohydride particles.

11. A method as recited in claim 8, comprising conveying said reaction products from said grinder/reactor to an unheated by-products storage vessel.

12. A method as recited in claim 8, comprising conveying said reaction products from said grinder/reactor to an unheated by-products storage vessel and conveying hydrogen gas from said by-products storage vessel to said hydrogen consuming device or to a hydrogen buffer container for said device.

* * * * *